United States Patent
Haruna et al.

(10) Patent No.: US 8,962,754 B2
(45) Date of Patent: Feb. 24, 2015

(54) NONAQUEOUS ELECTROLYTE SOLUTION AND LITHIUM ION BATTERY

(75) Inventors: Hiroshi Haruna, Tokyo (JP); Shingo Itoh, Tokyo (JP)

(73) Assignee: Shin-Kobe Electric Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/116,660

(22) PCT Filed: May 8, 2012

(86) PCT No.: PCT/JP2012/061757
§ 371 (c)(1),
(2), (4) Date: Nov. 8, 2013

(87) PCT Pub. No.: WO2012/153734
PCT Pub. Date: Nov. 15, 2012

(65) Prior Publication Data
US 2014/0079987 A1    Mar. 20, 2014

(30) Foreign Application Priority Data
May 9, 2011    (JP) ................................. 2011-104490

(51) Int. Cl.
| H01M 6/16 | (2006.01) |
| H01M 6/04 | (2006.01) |
| C08L 83/04 | (2006.01) |
| H01M 10/0567 | (2010.01) |
| H01M 10/0525 | (2010.01) |
| H01M 10/0568 | (2010.01) |

(52) U.S. Cl.
CPC ...... H01M 10/0567 (2013.01); H01M 10/0525 (2013.01); H01M 10/0568 (2013.01); Y02E 60/122 (2013.01)
USPC ........... 524/860; 429/332; 429/327; 429/326; 429/324; 429/188

(58) Field of Classification Search
CPC ..................... H01M 10/0525; H01M 10/0568; H01M 10/0567; Y02E 60/122
USPC ........... 429/332, 327, 326, 324, 188; 524/860
See application file for complete search history.

(56) References Cited

U.S. PATENT DOCUMENTS

2008/0020286 A1    1/2008    Haruna et al.

FOREIGN PATENT DOCUMENTS

| JP | 2003-317800 A | 11/2003 |
| JP | 2004-71458 A | 3/2004 |
| JP | 2008-27782 A | 2/2008 |
| JP | 2008027782 * | 2/2008 |
| JP | 4154951 B2 | 9/2008 |
| JP | 4423277 B2 | 3/2010 |
| JP | 2011-54406 A | 3/2011 |

OTHER PUBLICATIONS

Corresponding International Search Report with English Translation dated Jul. 31, 2012 (three (3) pages).

* cited by examiner

*Primary Examiner* — William Cheung
(74) *Attorney, Agent, or Firm* — Crowell & Moring LLP

(57) ABSTRACT

A nonaqueous electrolyte and a lithium ion battery with reduced temporal variations in battery characteristics from initial values are provided. A mixed solution is prepared by dissolving a lithium salt such as $LiPF_6$ in a nonaqueous solvent such as ethylene carbonate. Allylboronate ester and siloxane are mixed with the mixed solution. The content of the allylboronate ester is 1 wt % or less. The content of the siloxane is 2 wt % or less. 2-Allyl-4,4,5,5-tetramethyl-1,3,2-dioxaborolane is used as the allylboronate ester. At least one kind selected from hexamethyldisiloxane and 1,3-divinyltetramethyldisiloxane is used as the siloxane.

14 Claims, 1 Drawing Sheet

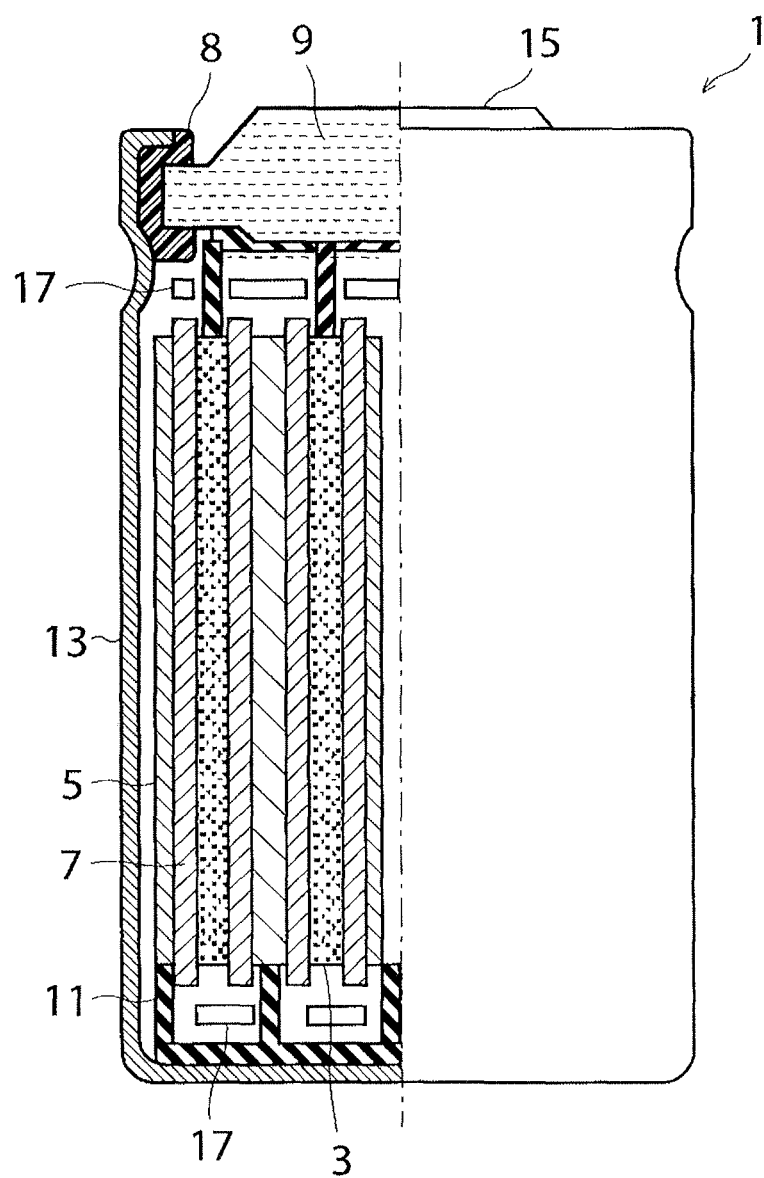

NONAQUEOUS ELECTROLYTE SOLUTION AND LITHIUM ION BATTERY

This application is a 35 U.S.C. 371 national stage entry of PCT International Application No. PCT/JP2012/061757, filed May 8, 2012, which claims priority to Japan Patent Application No. 2011-104490, filed May 9, 2011.

TECHNICAL FIELD

The present invention relates to a nonaqueous electrolyte prepared by dissolving a lithium salt in a nonaqueous solvent, and to a lithium ion battery including the nonaqueous electrolyte.

BACKGROUND ART

In recent years, there has been a need for a size reduction and an energy density increase for power sources for mobile communication devices such as cellular phones and portable personal computers. Under such circumstances, there have been developed nonaqueous electrolytes for lithium ion secondary batteries improved for the purpose of reducing temporal variations in battery characteristics from initial values (improving the discharge capacity). For example, Japanese Patent No. 4423277 (Patent Document 1) discloses a nonaqueous electrolyte for a lithium secondary battery prepared by adding allylboronate ester to a mixed solution obtained by adding a lithium salt to a nonaqueous solvent. Meanwhile, Japanese Patent No. 4154951 (Patent Document 2) discloses a nonaqueous electrolyte for a lithium secondary battery prepared by adding a cyclic siloxane to a mixed solution obtained by adding a lithium salt to a nonaqueous solvent.

RELATED-ART DOCUMENT

Patent Document

Patent Document 1: Japanese Patent No. 4423277
Patent Document 2: Japanese Patent No. 4154951

SUMMARY OF INVENTION

Technical Problem

With the nonaqueous electrolyte according to Patent Document 1, the discharge capacity of the lithium ion secondary battery can be improved to a certain degree by adding allylboronate ester. However, increasing the amount of allylboronate ester to be added increases the viscosity of the electrolyte. Therefore, the discharge capacity may not be improved any more even if the amount of siloxane to be added is increased. The same tendency is observed for the nonaqueous electrolyte according to Patent Document 2 to which siloxane is added.

An object of the present invention is to provide a nonaqueous electrolyte with reduced temporal variations in battery characteristics from initial values (with significantly improved discharge characteristics).

Another object of the present invention is to provide a lithium ion battery with significantly improved discharge characteristics.

Solution to Problem

A nonaqueous electrolyte to be improved by the present invention is a nonaqueous electrolyte including a mixed solution obtained by dissolving a lithium salt in a nonaqueous solvent. The nonaqueous solvent may be ethylene carbonate, propylene carbonate, gamma-butyrolactone, dimethyl carbonate, ethyl methyl carbonate, diethyl carbonate, or the like. In such solvents, an elemental sulfur or a halide such as a fluorine substitute may be used. The solvents may be used singly or in a mixture of two or more kinds. If two or more kinds of solvents are used, a mixed solvent system including a solvent with high viscosity such as a cyclic carbonate and a cyclic lactone and a solvent with low viscosity such as a chain carbonate and a chain ester is preferably used.

The lithium salt may be $LiPF_6$, $LiBF_4$, $LiClO_4$, $LiAsF_6$, $LiCF_3$, $Li(CF_3SO_3)$, $Li(CF_3SO_2)_2N$, $Li(C_2F_5SO_2)N$, or the like. The lithium salts may be used singly or in a mixture of two or more kinds.

The nonaqueous electrolyte according to the present invention contains allylboronate ester synthesized by pinacol coupling of a C=C double bond and a borate ester, and siloxane having a Si—O—Si bond. The amount of the allylboronate ester to be added is preferably 1 wt % or less. The amount of the siloxane to be added is preferably 2 wt % or less.

The discharge characteristics of a lithium ion secondary battery with the nonaqueous electrolyte battery according to the related art can be improved to a certain degree, but only to a limited degree. That is, with the nonaqueous electrolyte according to the related art, adding allylboronate ester alone or siloxane alone can improve the discharge capacity to a certain degree, but the discharge capacity is hardly increased along with an increase in amount of allylboronate ester or siloxane to be added.

On the contrary, use of the nonaqueous electrolyte according to the present invention in a lithium ion secondary battery can drastically improve the discharge characteristics compared to those of a lithium ion secondary battery including the nonaqueous electrolyte according to the related art. Specifically, adding siloxane and allylboronate ester significantly increases the discharge capacity compared to the related art. In addition, increasing the amount of allylboronate ester to be added in the presence of siloxane can increase the discharge capacity along with an increase in amount of allylboronate ester to be added (reduce temporal variations in battery characteristics from initial values). Meanwhile, increasing the amount of siloxane to be added in the presence of allylboronate ester can increase the discharge capacity along with an increase in amount of siloxane to be added.

With the nonaqueous electrolyte according to the related art, the discharge capacity is not increased along with an increase in amount of allylboronate ester alone to be added or amount of siloxane alone to be added. This is considered to be because the allylboronate ester alone or the siloxane alone increases the viscosity of the electrolyte to reduce the ion conductivity of the electrolyte. On the contrary, adding allylboronate ester and siloxane as in the present invention significantly improves the discharge characteristics of the nonaqueous electrolyte, and increases the discharge capacity along with an increase in amount of allylboronate ester and siloxane to be added. This is considered to be because a component of one of the allylboronate ester and the siloxane prevents an increase in viscosity of the electrolyte due to a component of the other, or the allylboronate ester and the siloxane interact with each other to prevent an increase in viscosity of the electrolyte, to prevent a reduction in ion conductivity of the electrolyte.

The amount of the allylboronate ester to be added is 1 wt % or less, because adding the allylboronate ester in an amount of more than 1 wt % conversely increases the viscosity of the electrolyte to reduce the discharge capacity. The amount of the siloxane to be added is 2 wt % or less, because adding the siloxane in an amount of more than 2 wt % is hardly expected to increase the discharge capacity along with an increase in amount of the siloxane to be added, and may rather increase the viscosity of the electrolyte to reduce the discharge capacity.

According to the present invention, 2-allyl-4,4,5,5-tetramethyl-1,3,2-dioxaborolane may be used as the allylboronate ester.

The siloxane may be alkyl siloxane of formula (1):

(1)

In formula (1), $R_1$, $R_2$, and $R_3$ are each an alkyl group having a carbon number of 1 to 20 and including at least one of H, S, O, Cl, Br, and I, n being an integer of 2 to 4. Such siloxane is preferably at least one kind selected from hexamethyldisiloxane and 1,3-divinyltetramethyldisiloxane.

The siloxane may also be a cyclic siloxane of formula (2):

(2)

In formula (2), $R_4$ and $R_5$ are each an alkyl group having a carbon number of 1 to 20 and including at least one of H, S, O, Cl, Br, and I, n being an integer of 3 to 6. Such a cyclic siloxane is preferably at least one kind selected from hexamethylcyclotrisiloxane and dodecamethylcyclohexanesiloxane.

Further, in order to improve various characteristics of the battery, additives for various purposes may be added, such as an agent for forming a film on the surface of the negative electrode, an agent for forming a film on the surface of the positive electrode, an overcharge preventing additive, an additive for imparting flame retardancy, a self-extinguishing additive, and an additive for improving the wettability of the electrodes and the separators, for example.

The nonaqueous electrolyte according to the present invention can be used as an electrolyte for a lithium ion secondary battery. If the nonaqueous electrolyte according to the present invention is used for a lithium ion secondary battery, the following may be used as a positive active material that reversibly occludes and releases lithium: layer compounds such as a lithium cobalt oxide ($LiCoO_2$) and a lithium nickel oxide ($LiNiO_2$), one or more kinds of these in which a transition metal is substituted, lithium manganese oxides $Li_{1+x}Mn_{2-x}O_4$ (x=0 to 0.33), $Li_{1+x}Mn_{2-x-y}M_yO_4$ (M contains at least one kind of metal selected from Ni, Co, Fe, Cu, Al, and Mg, x=0 to 0.33, y=0 to 1.0, 2−x−y>0), $LiMnO_4$, $LiMn_2O_4$, $LiMnO_2$, $LiMn_{2-x}M_xO_2$ (M contains at least one kind of metal selected from Ni, Co, Fe, Cu, Al, and Mg, and x=0.01 to 0.1), and $Li_2Mn_3MO_8$ (M contains at least one kind of metal selected from Ni, Co, Fe, and Cu), a copper-Li oxide ($Li_2CuO_2$), a disulfide compound, a mixture containing $Fe_2(MoO_4)_3$, and a mixture of one or two or more kinds of polyaniline, polypyrrole, and polythiophene.

Meanwhile, the following may be used as a negative active material that reversibly occludes and releases lithium: natural graphite, a graphitizable material obtained from petroleum coke, petroleum pitch coke, or the like that has been processed at a high temperature of 2500° C. or higher or processed at a temperature of around 2000° C., mesophase carbon, amorphous carbon, graphite with a surface coated with amorphous carbon, a carbon material obtained by mechanically processing natural graphite or artificial graphite to change the crystallinity of the surface, carbon fibers, lithium metal, a metal that can be alloyed with lithium, and a material in which a metal is carried on the surface of silicon or carbon particles. The metal carried on the surface of carbon particles may be a metal selected from lithium, aluminum, tin, silicon, indium, gallium, and magnesium, or an alloy of such metals.

The metals, the alloys, or oxides of such metals or alloys may be used as the negative active material. According to the lithium ion battery with the nonaqueous electrolyte, the discharge capacity can be significantly increased as discussed above, and the discharge capacity can be drastically improved.

BRIEF DESCRIPTION OF DRAWINGS

FIG. 1 is a perspective view illustrating a lithium ion battery (cylindrical battery) according to an embodiment of the present invention as partially exploded.

DESCRIPTION OF EMBODIMENTS

A lithium ion battery including a nonaqueous electrolyte according to an embodiment of the present invention will be described below. The lithium ion battery according to the embodiment of the present invention is fabricated as follows. First, the positive electrode material described above is mixed with a conductive material made of powdered carbon material, and a binding agent such as polyvinylidene fluoride (PVDF) to prepare slurry. The mixing ratio of the conductive material to the positive active material is preferably 5 to 20 wt %. In this event, a mixer including stirring means such as rotary blades is used to sufficiently knead the mixture such that powder particles of the positive active material are uniformly dispersed in the slurry.

After being sufficiently mixed, the slurry is applied to both surfaces of an aluminum foil with a thickness of 15 to 25 μm by a roll transfer applicator, for example. After the application to the two surfaces, the aluminum foil is subjected to press drying to obtain a positive electrode. The thickness of the electrode applied with the mixture is preferably 50 to 250 μm. The negative electrode is fabricated in the same manner as the positive electrode, by mixing an active material, which is formed from graphite, amorphous carbon, or a mixture thereof, with a binding agent, applying the mixture to a foil, and pressing the foil. The thickness of the electrode applied with the mixture is preferably 50 to 200 μm. For the negative electrode, a copper foil with a thickness of 7 to 20 μm is used as the current collector. The mixing ratio of the mixture is preferably 90:10 in terms of the weight ratio of the negative active material to the binding agent, for example. If the binding agent content is too large, the internal resistance value may be increased. If the binding agent content is too small, the shelf life and the cycle life of the battery may be reduced.

The electrode applied with the mixture is cut to a predetermined size, and tab portions for drawing out a current are formed by spot welding or ultrasonic welding. The tab portions are formed from a metal foil of the same material as the current collector in a rectangular shape, and are provided to take out a current from the electrode. The present invention is applicable to lithium secondary batteries for mobile bodies such as automobiles. Because such batteries require a large current flow, it is necessary to provide a plurality of tabs. The electrodes affixed with the tabs are stacked on each other with interposing separators made of a porous polyethylene (PE) resin, polypropylene (PP) resin, or the like, and the stacked assembly is wound into a cylindrical electrode group to be housed in a cylindrical container. Alternatively, the electrodes may be housed in bag-shaped separators, which may be sequentially stacked on each other to be housed in a rectangular container. Alternatively, the electrode group may be wound into a flat shape to be housed in a rectangular or elliptical container. The material of the container is preferably stainless steel or aluminum. After the electrode group is housed in the battery container, the battery container is filled with an electrolyte, and tightly sealed. The electrolyte is preferably prepared by dissolving $LiBF_4$ as an electrolyte in a solvent such as ethylene carbonate (EC), propylene carbonate (PC), or dimethyl carbonate (DMC). The concentration of the electrolyte is preferably 0.6 M to 1.5 M. The battery container is filled with the thus prepared electrolyte, and tightly sealed to complete a battery. In this way, a cylindrical battery 1 of the 18650 type to be discussed later (see FIG. 1) is fabricated as the lithium ion battery according to the embodiment.

The present invention will be further described below by way of specific examples including Examples and Comparative Examples of the present invention.

Example 1

$Li_{1.02}Mn_{1.96}Al_{0.02}O_4$ with an average grain size of 10 μm and a specific surface area of 1.5 m$^2$/g was used as the positive electrode material. A mixture obtained by mixing 85 wt % of the positive electrode material with block graphite and acetylene black mixed at a ratio of 9:2 was used as a conducting agent. The conducting agent was dissolved in an NMP solution prepared in advance to contain 5 wt % of PVDF as a binding agent to prepare slurry. The mixing ratio of the active material, the conducting agent, and the PVDF was 85:10:5 in terms of the weight ratio. The slurry was applied to an aluminum foil (positive current collector) with a thickness of 20 μm as uniformly and equally as possible. After the application, the slurry was dried at a temperature of 80° C. The application and the drying were performed for both sides of the aluminum foil in the same manner. After that, the aluminum foil was compression-molded by a roll pressing machine, and cut to an application width of 5.4 cm and an application length of 50 cm. A lead piece formed from an aluminum foil for taking out a current was welded to fabricate the positive electrode.

The negative electrode was fabricated as follows. Natural graphite was used as the negative active material, and mixed with an NMP solution of PVDF. The mixture was sufficiently kneaded to obtain negative electrode slurry. The mixing ratio of the negative active material and the PVDF was 90:10 in terms of the weight ratio. The slurry was applied to a rolled copper foil (negative current collector) with a thickness of 10 μm as uniformly and equally as possible. The application and drying was performed for both surfaces of the rolled copper foil in the same manner as the positive electrode. After that, the rolled copper foil was compression-molded by a roll pressing machine, and cut to an application width of 5.6 cm and an application length of 54 cm. A lead piece formed from a copper foil was welded to fabricate the negative electrode.

The fabricated positive electrode and negative electrode were used to fabricate the cylindrical battery 1 schematically illustrated in FIG. 1. An electrode group for the cylindrical battery 1 was fabricated by winding the fabricated positive electrode 3 and negative electrode 5 with separators 7 interposed therebetween so that the positive electrode 3 and the negative electrode 5 did not directly contact each other. In this event, a lead piece for the positive electrode (positive electrode lead piece 9) and a lead piece for the negative electrode (negative electrode lead piece 11) were disposed such that the positive electrode lead piece 9 and the negative electrode lead piece 11 were located on opposite end surfaces of the electrode group. A portion of the positive electrode applied with the mixture was located not to protrude from a portion of the negative electrode applied with the mixture. Microporous polyethylene films with a thickness of 30 μm and a width of 5.8 cm were used as the separators 7. The electrode group was inserted into a battery case 13 made of stainless steel. The negative electrode lead piece 11 was welded to the bottom of the case. The positive electrode lead piece 9 was welded to a lid portion 15 for tight sealing serving as a positive electrode current terminal.

The electrolyte was prepared by dissolving $LiBF_4$ as an electrolyte in a mixed solution, which was obtained by mixing ethylene carbonate (EC) and ethyl methyl carbonate (EMC) at a weight ratio of EC:EMC=1:2, such that the concentration of $LiBF_4$ was 1.0 mol/L. Further, vinylene carbonate was mixed with the mixed solution in an amount of 1 wt % with respect to the weight of the mixed solution. Next, 2-allyl-4,4,5,5-tetramethyl-1,3,2-dioxaborolane as allylboronate ester was mixed with the mixed solution discussed above in an amount of 0.5 wt % with respect to the weight of the mixed solution. Further, hexamethyldisiloxane $CH_3-Si(CH_3)_2-O-Si(CH_3)_2-CH_3$ as siloxane was mixed with the mixed solution in an amount of 0.5 wt % with respect to the weight of the mixed solution.

The thus prepared electrolyte was injected into a battery case 13 having a positive terminal mounted thereon. The battery case 13 is tightly sealed with a lid portion 15 via packing 8 by means of swaging. Thereby, the cylindrical battery 1 is obtained, having a diameter of 18 mm and a length of 650 mm. The lid portion 15 was provided with a release valve configured to crack when the pressure in the battery rises to release the pressure inside the battery. Reference numeral 17 denotes an insulating plate.

The thus fabricated cylindrical battery was subjected to a constant-current constant-voltage charge at a charging current of 1200 mA and a voltage of 4.2 V for five hours in a thermostat bath at 25° C., and to a constant-current discharge at a discharging current of 1200 mA to a battery voltage of 2.7 V. The charging and discharging process was defined as one cycle, and a total of three cycles were executed. Defining the discharge capacity in the third cycle as 100%, the ratio of the 1200 mA discharge capacity after a 60-day storage test was calculated. In the storage test, the battery was left to stand in a thermostat bath at 50° C. at a voltage of 4.2 V.

Example 2

A cylindrical battery was fabricated in the same manner as in Example 1 except that the amount of 2-allyl-4,4,5,5-tetramethyl-1,3,2-dioxaborolane to be mixed with the electrolyte was 1.0 wt %, and subjected to a battery test.

Example 3

A cylindrical battery was fabricated in the same manner as in Example 1 except that the amount of hexamethyldisiloxane to be mixed with the electrolyte was 1.0 wt %, and subjected to a battery test.

Example 4

A cylindrical battery was fabricated in the same manner as in Example 1 except that the amount of 2-allyl-4,4,5,5-tetramethyl-1,3,2-dioxaborolane to be mixed with the electrolyte was 1.0 wt % and the amount of hexamethyldisiloxane to be mixed with the electrolyte was 1.0 wt %, and subjected to a battery test.

Example 5

A cylindrical battery was fabricated in the same manner as in Example 1 except that the amount of hexamethyldisiloxane to be mixed with the electrolyte was 2.0 wt %, and subjected to a battery test.

Example 6

A cylindrical battery was fabricated in the same manner as in Example 1 except that the amount of 2-allyl-4,4,5,5-tetramethyl-1,3,2-dioxaborolane to be mixed with the electrolyte was 1.0 wt % and the amount of hexamethyldisiloxane to be mixed with the electrolyte was 2.0 wt %, and subjected to a battery test.

Comparative Example 1

The electrolyte was prepared by dissolving $LiBF_4$ as an electrolyte in a mixed solution, which was obtained by mixing ethylene carbonate (EC) and ethyl methyl carbonate (EMC) at a weight ratio of EC:EMC=1:2, such that the concentration of $LiBF_4$ was 1.0 mol/L. Further, only vinylene carbonate was mixed with the mixed solution in an amount of 1 wt % with respect to the weight of the mixed solution. A cylindrical battery was fabricated in the same manner as in Example 1 except that the thus prepared electrolyte was used, and subjected to a battery test.

Comparative Example 2

A cylindrical battery was fabricated in the same manner as in Comparative Example 1 except that 2-allyl-4,4,5,5-tetramethyl-1,3,2-dioxaborolane was mixed with the electrolyte in an amount of 0.5 wt %, and subjected to a battery test.

Comparative Example 3

A cylindrical battery was fabricated in the same manner as in Comparative Example 1 except that 2-allyl-4,4,5,5-tetramethyl-1,3,2-dioxaborolane was mixed with the electrolyte in an amount of 1.0 wt %, and subjected to a battery test.

Comparative Example 4

A cylindrical battery was fabricated in the same manner as in Comparative Example 1 except that 2-allyl-4,4,5,5-tetramethyl-1,3,2-dioxaborolane was mixed with the electrolyte in an amount of 2.0 wt %, and subjected to a battery test.

Comparative Example 5

A cylindrical battery was fabricated in the same manner as in Comparative Example 1 except that 2-allyl-4,4,5,5-tetramethyl-1,3,2-dioxaborolane was mixed with the electrolyte in an amount of 2.0 wt % and hexamethyldisiloxane was mixed with the electrolyte in an amount of 0.5 wt %, and subjected to a battery test.

Comparative Example 6

A cylindrical battery was fabricated in the same manner as in Comparative Example 1 except that 2-allyl-4,4,5,5-tetramethyl-1,3,2-dioxaborolane was mixed with the electrolyte in an amount of 2.0 wt % and hexamethyldisiloxane was mixed with the electrolyte in an amount of 1.0 wt %, and subjected to a battery test.

Comparative Example 7

A cylindrical battery was fabricated in the same manner as in Comparative Example 1 except that 2-allyl-4,4,5,5-tetramethyl-1,3,2-dioxaborolane was mixed with the electrolyte in an amount of 2.0 wt % and hexamethyldisiloxane was mixed with the electrolyte in an amount of 2.0 wt %, and subjected to a battery test.

Comparative Example 8

A cylindrical battery was fabricated in the same manner as in Comparative Example 1 except that hexamethyldisiloxane was mixed with the electrolyte in an amount of 0.5 wt %, and subjected to a battery test.

Comparative Example 9

A cylindrical battery was fabricated in the same manner as in Comparative Example 1 except that hexamethyldisiloxane was mixed with the electrolyte in an amount of 1.0 wt %, and subjected to a battery test.

Comparative Example 10

A cylindrical battery was fabricated in the same manner as in Comparative Example 1 except that hexamethyldisiloxane was mixed with the electrolyte in an amount of 2.0 wt %, and subjected to a battery test.

TABLE 1

| | Allylboronate ester (wt %) | Siloxane (wt %) | Discharge capacity (%) |
|---|---|---|---|
| Com. Ex. 1 | 0 | 0 | 62 |
| Com. Ex. 2 | 0.5 | 0 | 65 |
| Com. Ex. 3 | 1.0 | 0 | 66 |
| Com. Ex. 4 | 2.0 | 0 | 58 |
| Ex. 1 | 0.5 | 0.5 | 69 |
| Ex. 2 | 1.0 | 0.5 | 71 |
| Com. Ex. 5 | 2.0 | 0.5 | 63 |
| Ex. 3 | 0.5 | 1.0 | 72 |
| Ex. 4 | 1.0 | 1.0 | 75 |
| Com. Ex. 6 | 2.0 | 1.0 | 62 |
| Ex. 5 | 0.5 | 2.0 | 71 |
| Ex. 6 | 1.0 | 2.0 | 74 |
| Com. Ex. 7 | 2.0 | 2.0 | 55 |
| Com. Ex. 8 | 0 | 0.5 | 65 |
| Com. Ex. 9 | 0 | 1.0 | 67 |
| Com. Ex. 10 | 0 | 2.0 | 66 |

Table 1 illustrates the high-temperature storage characteristics of each battery after the 60-day battery test discussed above. First, when only allylboronate ester was added in an amount of 0.5 wt % to the battery with no allylboronate ester or siloxane added (Comparative Example 1), the discharge capacity was improved by 3% (Comparative Example 2). However, increasing the amount of allylboronate ester to be added to 1.0 wt % resulted in an improvement in discharge capacity of only 1% (Comparative Example 3). Increasing the amount of allylboronate ester to be added to 2.0 wt % resulted in a reduction in discharge capacity (Comparative Example 4).

On the contrary, adding allylboronate ester in an amount of 0.5 wt % with siloxane added in an amount of 0.5 wt % resulted in an improvement in discharge capacity of 7% (Example 1). Increasing the amount of allylboronate ester to be added to 1.0 wt % resulted in an improvement in discharge capacity of additional 2% (Example 2). Increasing the amount of allylboronate ester to be added to 2.0 wt % resulted in a reduction in discharge capacity (Comparative Example 5) compared to a case where no allylboronate was added.

Meanwhile, adding allylboronate ester in an amount of 0.5 wt % with the amount of siloxane to be added increased to 1.0 wt % resulted in an improvement in discharge capacity of 9% (Example 3). Increasing the amount of allylboronate ester to be added to 1.0 wt % resulted in an improvement in discharge capacity of additional 2% (Example 4). Increasing the amount of allylboronate ester to be added to 2.0 wt % resulted in a reduction in discharge capacity (Comparative Example 6).

Further, adding allylboronate ester in an amount of 0.5 wt % with the amount of siloxane to be added increased to 2.0 wt % resulted in an improvement in discharge capacity of 9% (Example 5). Increasing the amount of allylboronate ester to be added to 1.0 wt % resulted in an improvement in discharge capacity of additional 3% (Example 4). Increasing the amount of allylboronate ester to be added to 2.0 wt % resulted in a reduction in discharge capacity (Comparative Example 7).

If is found from the results of Examples 1 to 6 and Comparative Examples 1 to 3 that adding allylboronate ester in an amount of 1 wt % or less in the presence of siloxane in an amount of 2 wt % or less resulted in a significant increase in discharge capacity compared to a case where allylboronate ester was added in an amount of 1 wt % or less without adding siloxane. In addition, if is found from the results of Examples 1 to 6 and Comparative Examples 2 and 3 that increasing the amount of allylboronate ester to be added within the range of 1 wt % or less in the presence of siloxane in an amount of 2 wt % or less resulted in an increase in discharge capacity of 1%, and that increasing the amount of allylboronate ester to be added within the range of 1 wt % or less without adding siloxane resulted in an increase in discharge capacity of 2 to 3%. That is, in the presence of siloxane, the rate of increase in discharge capacity became higher along with an increase in amount of allylboronate ester to be added. It is thus found that the discharge characteristics were improved by adding allylboronate ester in an amount of 1 wt % or less in the presence of siloxane in an amount of 2 wt % or less.

Because the discharge capacity was improved in the presence of siloxane as in Examples 1 to 6, it was suspected that adding only siloxane without adding allylboronate ester could improve the discharge capacity compared to the related art. Thus, the discharge capacity was observed when only siloxane was added without adding allylboronate ester (Comparative Examples 8 to 10). First, adding siloxane in an amount of 0.5 wt % resulted in an improvement in discharge capacity of 3% (Comparative Example 8). Increasing the amount of siloxane to be added to 1.0 wt % resulted in an improvement in discharge capacity of only 2% (Comparative Example 9). Increasing the amount of siloxane to be added to 2.0 wt % resulted in an improvement in discharge capacity of only 1% (Comparative Example 4). The tendency of the discharge capacity seen when only siloxane was added as in Comparative Examples 8 to 10 was substantially the same as the tendency of the discharge capacity seen when only allylboronate ester was added as in Comparative Examples 2 to 4. Thus, adding only siloxane without adding allylboronate ester slightly improved the discharge characteristics, but did not significantly improve the discharge characteristics as achieved by the present invention. In addition, increasing the amount of siloxane to be added without adding allylboronate ester hardly improved the discharge characteristics as the amount of siloxane to be added increased. Thus, the significant improvement in discharge characteristics achieved by mixing allylboronate ester and siloxane is also supported by the results of Comparative Examples 8 to 10.

Although an embodiment and examples of the present invention have been specifically described above, the present invention is not limited to such an embodiment and examples, and it is a matter of course that changes may be made based on the technical concept of the present invention.

INDUSTRIAL APPLICABILITY

According to the present invention, adding allylboronate ester in an amount of 1 wt % or less and siloxane in an amount of 2 wt % or less can significantly improve the discharge capacity compared to the related art. In addition, increasing the amount of allylboronate ester to be added in the presence of siloxane can increase the discharge capacity along with an increase in amount of allylboronate ester to be added. Further, increasing the amount of siloxane to be added in the presence of allylboronate ester can increase the discharge capacity along with an increase in amount of siloxane to be added. Thus, use of the nonaqueous electrolyte according to the present invention in a lithium ion battery can drastically improve the discharge characteristics compared to those of a lithium ion battery including the nonaqueous electrolyte according to the related art.

REFERENCE SIGNS LIST

1 lithium ion battery (cylindrical battery)
3 positive electrode
5 negative electrode
7 separator
8 packing
9 positive electrode lead piece
11 negative electrode lead piece
13 battery case
15 lid portion
17 insulating plate

The invention claimed is:

1. A nonaqueous electrolyte comprising a mixed solution obtained by dissolving a lithium salt in a nonaqueous solvent, wherein:
   the mixed solution contains allylboronate ester and siloxane;
   the content of the allylboronate ester is 1 wt % or less; and
   the content of the siloxane is 2 wt % or less.

2. The nonaqueous electrolyte according to claim 1, wherein the allylboronate ester is 2-allyl-4,4,5,5-tetramethyl-1,3,2-dioxaborolane.

3. The nonaqueous electrolyte according to claim 1, wherein the siloxane is alkylsiloxane of formula (1):

$$R_1-(Si-(R_2,R_3)-O-)_n \quad (1)$$

where $R_1$, $R_2$, and $R_3$ are each an alkyl group having a carbon number of 1 to 20 and including at least one of H, S, O, Cl, Br, and I, n being an integer of 2 to 4.

4. The nonaqueous electrolyte according to claim 3, wherein
   the alkylsiloxane is at least one kind selected from hexamethyldisiloxane and 1,3-divinyltetramethyldisiloxane.

5. The nonaqueous electrolyte according to claim 1, wherein
   the siloxane is a cyclic siloxane of formula (2):

$$(-Si-(R_4,R_5)-O-)_n \quad (2)$$

where $R_4$ and $R_5$ are each an alkyl group having a carbon number of 1 to 20 and including at least one of H, S, O, Cl, Br, and I, n being an integer of 3 to 6.

6. The nonaqueous electrolyte according to claim 5, wherein
   the cyclic siloxane is at least one kind selected from hexamethylcyclotrisiloxane and odecamethylcyclohexanesiloxane.

7. The nonaqueous electrolyte according to claim 1, wherein
the lithium salt is at least one kind selected from $LiPF_6$, $LiBF_4$, $LiClO_4$, $LiAsF_6$, $LiCF_3$, $Li(CF_3SO_3)$, $Li(CF_3SO_2)_2N$, and $Li(C_2F_5SO_2)N$.

8. A lithium ion battery comprising the nonaqueous electrolyte according to claim 1.

9. A lithium ion battery comprising the nonaqueous electrolyte according to claim 2.

10. A lithium ion battery comprising the nonaqueous electrolyte according to claim 3.

11. A lithium ion battery comprising the nonaqueous electrolyte according to claim 4.

12. A lithium ion battery comprising the nonaqueous electrolyte according to claim 5.

13. A lithium ion battery comprising the nonaqueous electrolyte according to claim 6.

14. A lithium ion battery comprising the nonaqueous electrolyte according to claim 7.

* * * * *